Dec. 18, 1923.
R. J. O'BRIEN
1,477,845
SECTIONAL RADIATOR FOR MOTOR VEHICLES
Filed Dec. 16, 1921
3 Sheets-Sheet 1
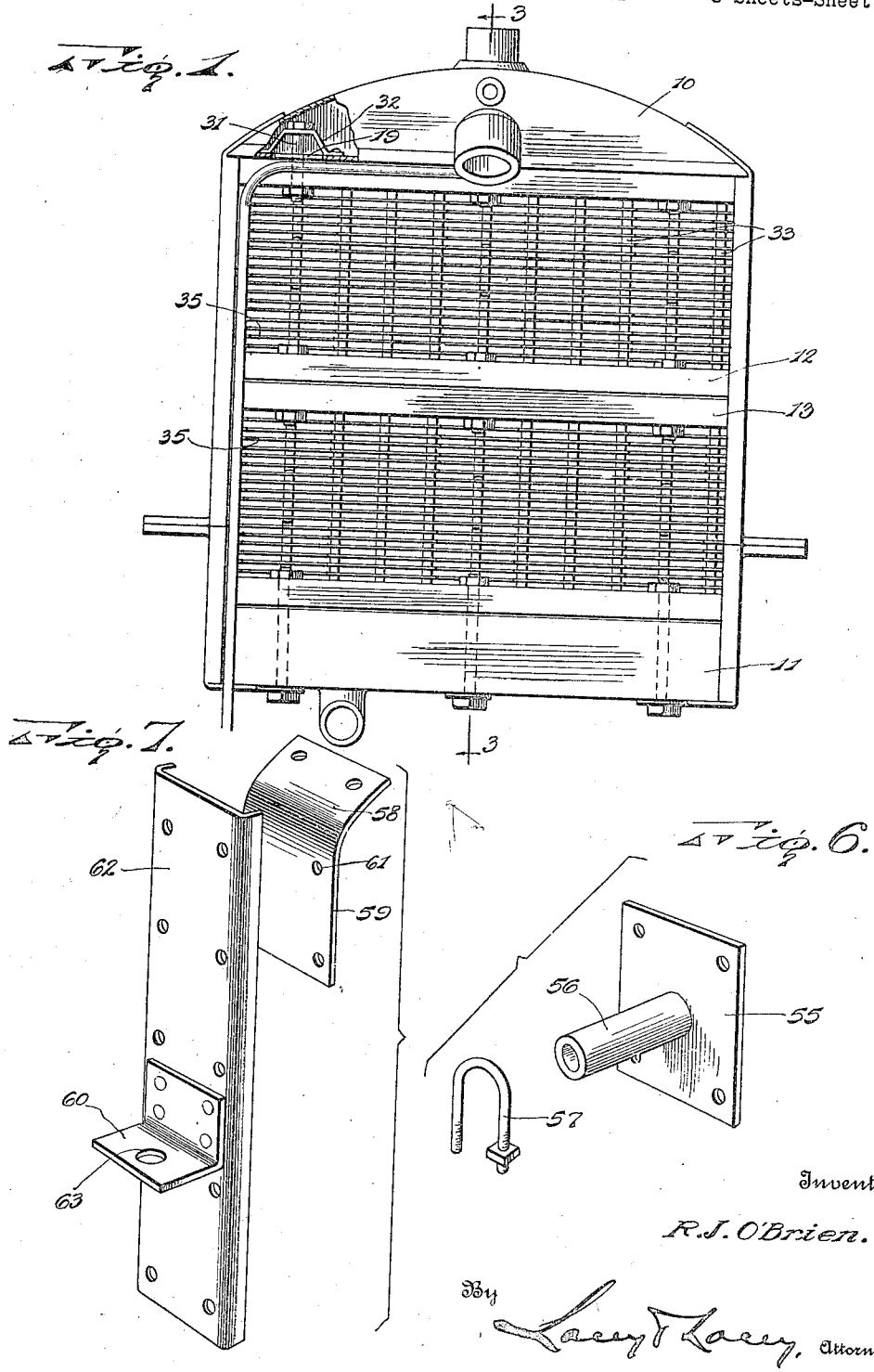
Inventor
R.J. O'Brien.
By Lacey & Lacey, Attorneys

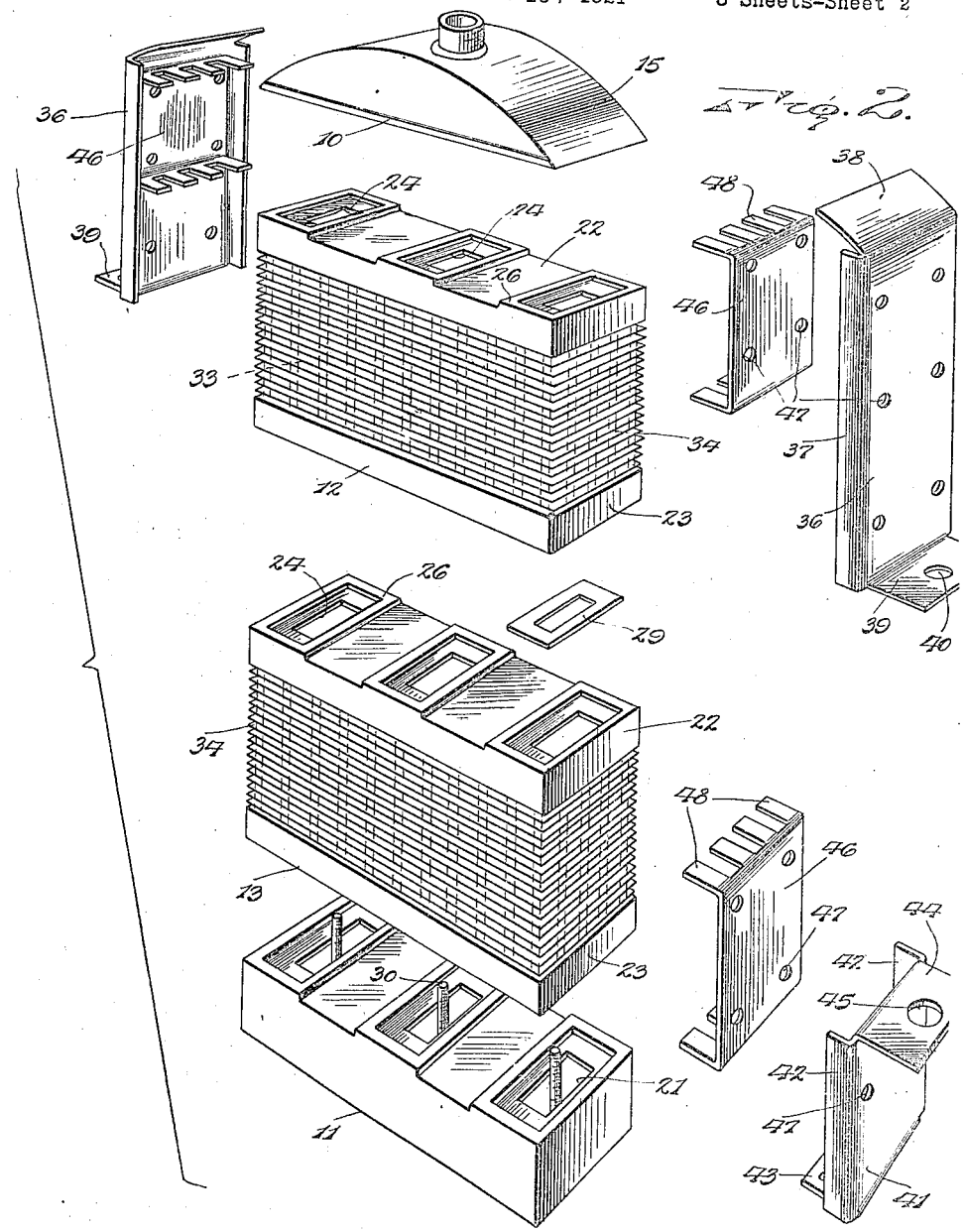

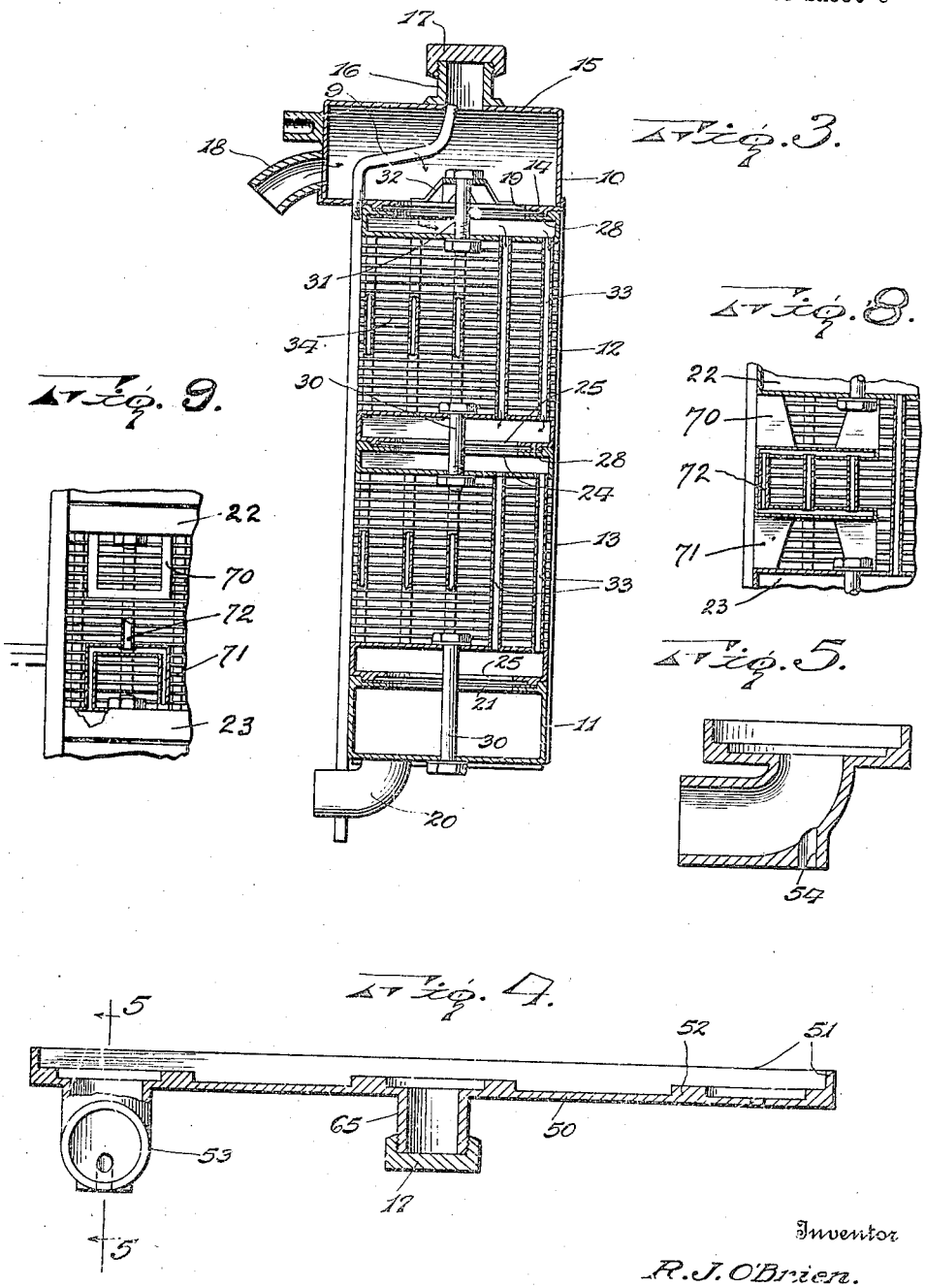

Patented Dec. 18, 1923.

1,477,845

UNITED STATES PATENT OFFICE.

RAYMOND J. O'BRIEN, OF BUTTE, MONTANA.

SECTIONAL RADIATOR FOR MOTOR VEHICLES.

Application filed December 16, 1921. Serial No. 522,850.

*To all whom it may concern:*

Be it known that I, RAYMOND J. O'BRIEN, a citizen of the United States, residing at Butte, in the county of Silver Bow and State of Montana, have invented certain new and useful Improvements in Sectional Radiators for Motor Vehicles, of which the following is a specification.

The present invention relates to a cooling system for engines in general and more particularly to radiators for automobiles.

The main object of this invention is to provide a sectional radiator, that is to say, the device is of the size and contour of an ordinary radiator of this class, but is made up of a number of sections, which may be easily taken apart or put together, so that any one of the sections may be replaced by a similar section in case of damage or if no spare sections were available, the damaged section may be entirely removed and the sound sections again assembled and installed on the engine, in case of an emergency.

The sections may be made either horizontal, vertical, or diagonal, and the tubes used may be of square, round, flat, or any other suitable cross section and installed either straight or curved as most suitable for the occasion.

The advantage of this device will readily be understood. In case an automobile radiator should be accidentally damaged, while the engine and automobile in other respects were intact, it would be extremely dangerous to drive the car, even at a comparatively slow speed, without a radiator or so long as the engine could not be water cooled. On the other hand, an automobile furnished with my sectional radiator, could be driven at least at a moderate speed, without injury to the engine, so long as at least one of the radiator sections were intact and the damaged ones removed.

Another advantage of my device is in the saving of repairing costs, as it would be considerably cheaper to replace one section of the radiator than to have an entire new one installed. If an extra hose connection and one or more of the intermediary radiator sections were carried as spare parts in an automobile, any repairs to the radiator may easily be made on the road by the driver, thereby avoiding damage to the engine and affording means to bring the car safely to its destination or at least to a nearby repair shop if other damages had to be attended to.

In the accompanying drawings the invention has been illustrated as applied to a Ford automobile, but it will be evident, that the invention applies equally well to any other design of radiator or make of automobiles as well as to stationary engines.

Figure 1 shows a rear elevation of the assembled radiator;

Figure 2 is a perspective view of the different sections and connecting parts constituting the radiator unit;

Figure 3 is a vertical section along line 3—3 of Figure 1;

Figure 4 is a modified form of the bottom section;

Figure 5 is a transverse section along line 5—5 Figure 4;

Figure 6 is a perspective view of a modified form of attaching means;

Figure 7 is still another modification of the attaching means;

Figure 8 shows in cross section a modified form of one of the radiator sections; and Figure 9 is a fragmental front view of the same, partly in section.

As illustrated in Figures 1, 2, and 3 the device consists of four main parts or sections, that is to say the top section 10, the bottom section 11 and two intermediary sections 12 and 13.

The top section consists of a tank enclosed on all sides and with a flat bottom 14 and a curved roof 15. The usual filler neck 16 with its cap 17 is provided in the roof 15 and an inlet port 18 is provided in the inner wall of the tank or top section 10 and adapted to be connected in the usual manner with a rubber hose to the cooling conduit of the engine. The bottom of the top section or the tank 10 is provided with a plurality of apertures 19 adapted to register with the apertures in the next section as will be more fully described further on. The usual overflow pipe 9 has been shown opening in the filler neck 16 and terminating below the radiator unit.

The bottom section 11 is also constructed as a tank of rectangular cross section and provided with an outlet port 20 which is connected in the usual manner by a short piece of hose to the cooling conduit of the engine. The bottom tank 11 is provided with apertures 21, of which three have been shown in Figure 2.

The intermediary sections 12 and 13 are both alike and constructed with a top pan 22 and a bottom pan 23. These pans are of rectangular cross section and provided with apertures 24 and 25, three in number and adapted to register with the apertures 19 and 21 respectively, or with the corresponding apertures in the adjacent intermediary section. The apertures 24 and 21 in the upper sides of the sections 11, 12 and 13 are each provided with a surrounding rabbet 26, with which a corresponding bead 28 in the lower walls of sections 10, 12 and 13 are intended to engage and a rubber or soft metal gasket 29 is provided to be inserted in the rabbet under each of the beads 28 to form a tight connection between different sections.

Between the upper pan 22 and the lower pan 23 of each of the intermediary sections 12 and 13 and securely fastened in the opposing walls of these pans are provided circulating tubes 33. These tubes 33 are shown in Figures 1, 2 and 3 as being straight, but may in some cases be curved or helical, as the occasion might require. Preferably a number of radiating fins 34 are attached to the upright tubes 33 in the ordinary manner to facilitate the radiation of the heat from the tubes. As best seen in Figure 1 some of these fins have been removed or made shorter, so as to provide sufficient space for entering or removing the bolts and nuts 30 as best seen at 35 of said figure.

Bolts and nuts 30 running through the apertures 24 and 25 and through holes in the opposite walls of the sections connect the intermediary sections together as well as the lower section 13 with the bottom section 11 and suitable packing rings are provided under the heads and nuts of these bolts 30 to prevent any leakage at these points. Bolts and nuts 31 are provided for the tank or top section 10 in order to securely fasten the same to the upper intermediary section 12. As the bottom wall of this tank has apertures 19, where the bolts 31 enter, a suitable spider 32 straddling the aperture 19 is provided for supporting the head of the bolt 31 so that the circulation of the water will not be impeded by these bolts.

For the purpose of securing the radiator unit to the frame of an engine, an upper side plate 36 is provided on each side of the radiator. This is preferably made with side flanges 37 bent inwardly and adapted to engage the front and rear sides of the radiator. The side plate has also a top flange 38 curved to conform with the roof 15 of the tank 10 and an outwardly bent bottom flange 39 with a bolt hole 40. A lower side plate 41 has similar side flanges 42 for engaging the front and rear sides of the lower part of the radiator unit and a bottom flange 43 projecting inwardly in order to engage with the bottom of the lower tank 11, to which it may be riveted or bolted. The upper edge of the side plate 41 has a flange 44 bent outwardly and provided with a bolt hole 45 registering with the bolt hole 40 in the upper side plate 36.

For the intermediary sections 12 and 13 are provided securing plates 46 which are bolted to the side plates 36 and 41 for which purpose suitable holes 47 are provided in these plates. The upper and lower ends of these plates 46 are bent inwardly and partly cut away so as to form a number of fingers 48 intended to enter between the tubes 33 and grip the same in order to hold the intermediary sections rigidly in the longitudinal direction of the automobile.

After the radiator sections and the side plates have been assembled in the manner described, bolts are passed through the holes 40 and 45 and through corresponding holes in the frame of the engine for securing the radiator unit thereto.

In Figures 4 and 5 has been shown an emergency bottom intended to replace the bottom tank 11 in case of injury of the same. This bottom 50 is constructed similarly to the bottom of the tank 11 but does not have a chamber formed therein, that is to say it is open on the upper side and provided with side flanges 51 intended to fit closely around the bottom pan of one of the intermediary sections 12 and 13. It is provided with a rabbet 52 for each of the beads 28 surrounding the lower apertures 25 in said intermediary sections and has also an outlet port 53 similarly constructed to port 20 in the tank 11. This bottom plate 50 is secured by means of bolts 13 in a similar manner as has already been described, one of those bolts however must be longer than the rest, because it has to pass perpendicularly through the port 53 in which a suitable hole 54 has been provided. It will be evident that a plate similar to this bottom 50 may be used to replace the upper tank 10, when the port 53 will serve as an inlet port similar to the one 18 provided on the upper tank 10, and pipe 65 as a filler neck.

A modified form of securing the radiator unit to the engine frame is illustrated in Figure 7, in which a top plate 58 curved to conform with the arc roof 15 of the upper tank 10 is riveted, or in any other manner secured, to the tank. It has a perpendicular arm 59 with suitable bolt holes 61 for bolting the same to the outer side plate 62. This side plate extends the whole distance from top to bottom of the radiator unit and is bolted to the securing plates 46 of the intermediary sections. In this case an angle 60 is riveted on the outside of the side plate 62 for bolting it to the engine frame, for which purpose a suitable hole 63 is provided therein.

Still another modified form of fastening is illustrated in Figure 6 where a plate 55 with a transverse stud 56 is intended to replace the angle 60 shown in Figure 7 and a staple 57 with nuts holds the stud 56 down on the frame of the engine.

It will be evident that slight modifications to the sections making up the radiator unit, or to the fastening appliances, may be made without deviating from the scope of the invention, such for instance as constructing the top and bottom tanks alike, so that they may be interchanged in an emergency.

It will also be evident that any number of the intermediary sections may be provided in order to enlarge the radiator and that instead of building one on top of the other they may be placed side by side with the tanks 10 and 11 forming the end sections.

In Figures 8 and 9 I show a modification of the intermediary radiator section in order to increase the radiation which would otherwise be diminished through the cutting away of the fins and pipes in spaces 35 as described above. For this reason I provide in this space smaller upper and lower pans 70, 71 attached to and opening into the pans 22, 23 of the intermediary radiator section. The ends of the shortened pipes 72 are also secured in the smaller pans 70, 71, so that water circulation through the latter and through pans 22, 23 and pipes 72 may take place. In this manner, although these pipes have been shortened and some of the fins cut away, the circulation will not be diminished, nor the radiation.

Having thus described the invention what is claimed as new is:

1. A motor cooling device comprising end and intermediary radiator sections, and means for rigidly securing said sections together to form a unit; one of said end sections being formed as an enclosed tank with an inlet port, the other end section having an outlet port, both ports adapted to be connected to the motor cooling conduit; and both end sections being interchangeable each of said intermediary sections including a pair of spaced pans forming water chambers, pipe connections between said pans and radiating fins surrounding said pipe connections, the contiguous walls of said pans and said end sections having corresponding apertures, whereby water may be circulated through all the radiator sections, and means for rigidly securing said device to the motor frame, said means including fingered elements engaging between said pipe connections of the intermediary sections.

2. A motor cooling device comprising end and intermediary radiator sections, and means for rigidly securing said sections together to form a unit; one of said end sections being formed as an enclosed tank with an inlet port, the other end section having an outlet port, both ports adapted to be connected to the motor cooling conduit; each of said intermediary sections including a pair of spaced pans forming water chambers, pipe connections between said pans and radiating fins surrounding said pipe connections, the contiguous walls of said pans and said end sections having corresponding apertures, whereby water may be circulated through all the radiator sections, and means for rigidly securing said device to the motor frame, said last securing means including fingered elements adapted to engage the tubes in said intermediary sections and exterior plates bolted to said fingered plates and provided with transverse elements adapted to be bolted to the motor frame.

In testimony whereof I affix my signature.

RAYMOND J. O'BRIEN. [L. S.]